United States Patent
Yarbrough

(10) Patent No.: US 6,775,965 B2
(45) Date of Patent: Aug. 17, 2004

(54) ROPER'S QUICK RELEASE SADDLE HORN ATTACHMENT

(76) Inventor: Berl Leon Yarbrough, 2862 N. DeWolf, Fresno, CA (US) 93727

( * ) Notice: Subject to any disclaimer, the term of this patent is extended or adjusted under 35 U.S.C. 154(b) by 0 days.

(21) Appl. No.: 10/417,286

(22) Filed: Apr. 17, 2003

(65) Prior Publication Data

US 2004/0079056 A1 Apr. 29, 2004

Related U.S. Application Data

(60) Provisional application No. 60/420,366, filed on Oct. 23, 2002.

(51) Int. Cl.[7] .............................................. B68C 1/02
(52) U.S. Cl. ................................................. 54/44.1
(58) Field of Search ........................ 54/44.1; 119/772; 24/115 K, 115 F

(56) References Cited

U.S. PATENT DOCUMENTS

| | | | | |
|---|---|---|---|---|
| 704,265 A | * | 7/1902 | McMaster | 473/442 |
| 963,501 A | * | 7/1910 | Den Besten | 278/22 |
| 1,344,818 A | * | 6/1920 | Pogue | 280/453 |
| 1,682,994 A | * | 9/1928 | Simon | 172/269 |
| 2,985,138 A | * | 5/1961 | Fortin | 119/772 |
| 3,269,094 A | * | 8/1966 | Marvin | 54/44.1 |
| 3,288,112 A | * | 11/1966 | Welton | 119/772 |
| 4,823,568 A | * | 4/1989 | Rogers et al. | 70/58 |
| 5,949,339 A | * | 9/1999 | Ettinger et al. | 340/573.1 |

* cited by examiner

Primary Examiner—Charles T. Jordan
Assistant Examiner—Bret Hayes

(57) ABSTRACT

A quick release designed as a safety tool for heelers participating in the sport of team roping. During the history of team roping numerous heelers have cut off fingers and hands, when wrapping the rope around the horn of their saddle in an effort to pull the rope tight around the steer's hind legs. This quick release was designed to eliminate the daily (wrapping the rope around the horn) process. The quick release strap is wrapped around the saddle horn and buckled into place. The end of the rope is placed in the loop of the quick release. After the steer is roped, the heeler pulls on the release and the rope is freed. Thus eliminating any chance of fingers or hands being caught between the rope and the horn. For added safety, the rope can be release wither it is tight or loose.

3 Claims, 1 Drawing Sheet

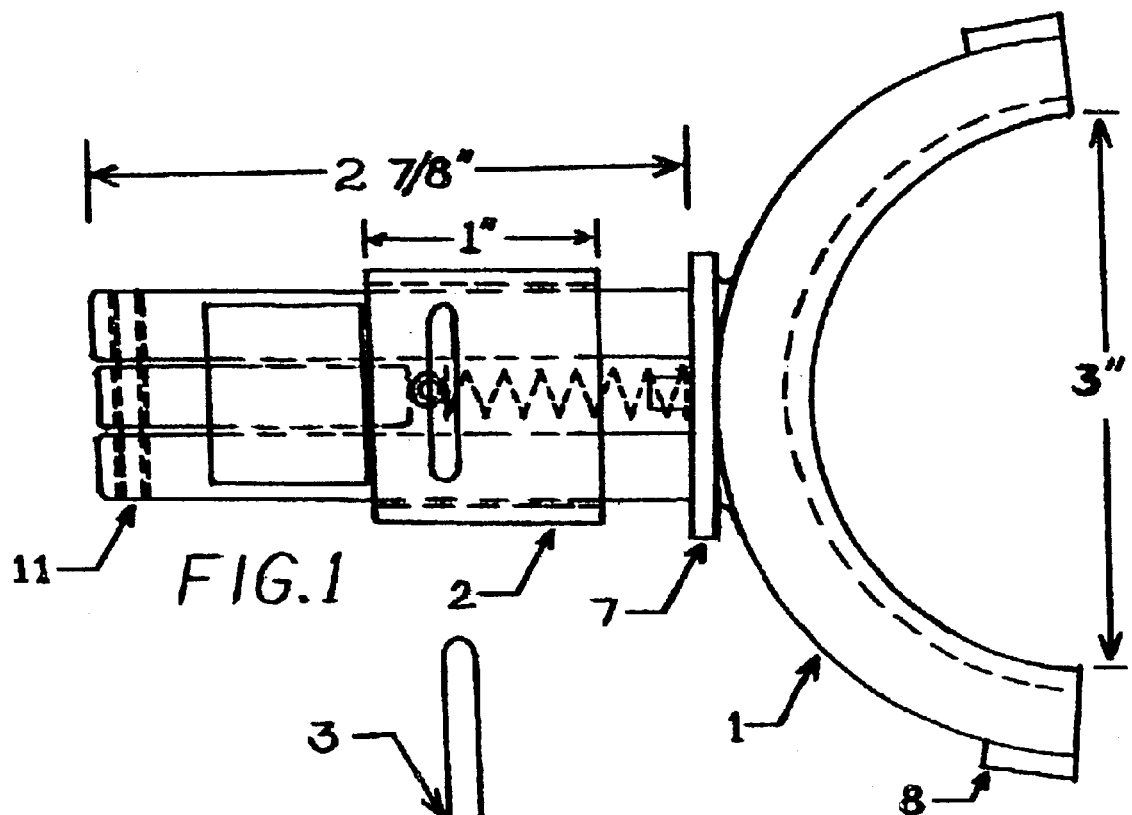
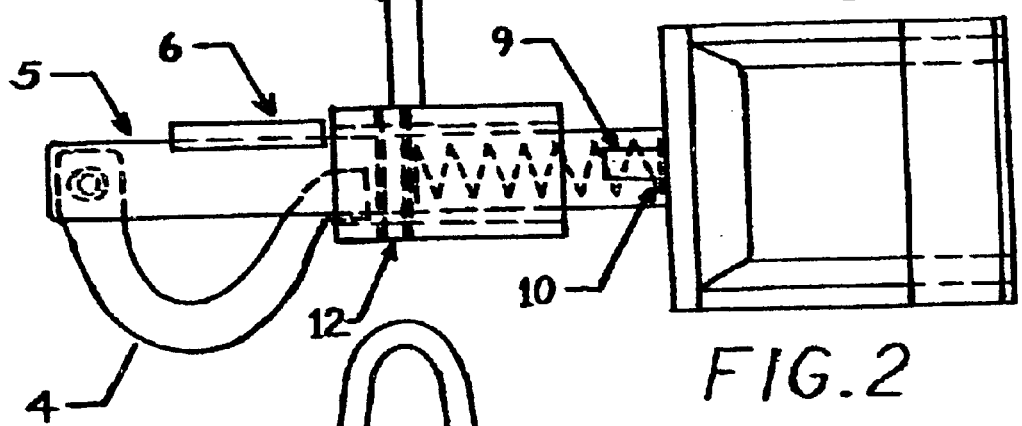
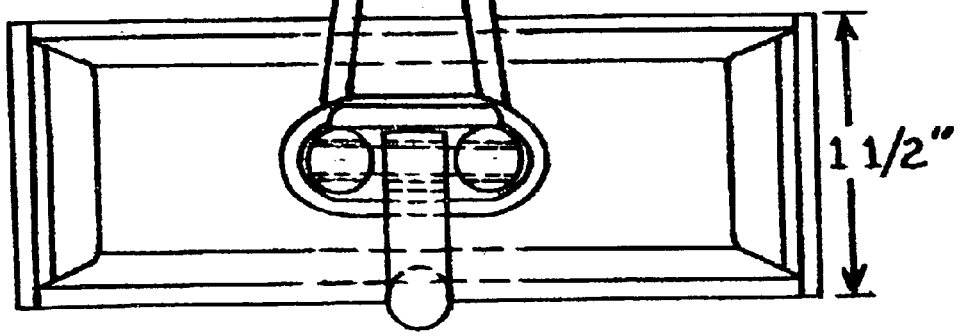

ROPER'S QUICK RELEASE SADDLE HORN ATTACHMENT

This application claims benefit of Ser. No. 60/420,366 filed Oct. 23, 2002.

BACKGROUND OF THE INVENTION

In the sport of Rodeo there is an event known as Team Roping. This event consists of two persons who work as a team in a timed event to catch a steer, each person using a rope. One team member ropes the steer around the horns and then the other team member ropes the hind legs of the steer. The person roping the hind legs is allowed to have his rope tied to the horn of the saddle on which he is riding. After roping the steer this rope often needs to be released from the saddle horn. The rope may also need to be released during the performance to provide safety for the persons and/or animals involved if things are not happening properly. This invention is designed to attach to the saddle horn and provide a means for both attaching the rope and for a quick release of the rope as needed.

BRIEF SUMMARY OF THE INVENTION

The invention is attached to the front of the saddle horn by a buckled nylon strap (not shown in drawings) which is threaded through the Mount (FIG. 1, Ref. 1). The users rope is attached to the invention by sliding the spring loaded Latch Release (FIG. 1, Ref. 2) toward the saddle horn by pulling back on the Latch Release Handle (FIG. 2, Ref. 3). This action releases the Latch (FIG. 2, Ref. 4). The rope, which is knotted at the end, is placed between the Latch (FIG. 2, Ref. 4) and the Guides (FIG. 2, Ref. 5). The Latch (FIG. 2, Ref. 4) is then lifted into position and the Latch Release Handle (FIG. 2, Ref. 3) is released allowing the Latch Release (FIG. 1, Ref. 2) to slide forward to the Stop Block (FIG. 2, Ref. 6) thus securing the Latch (FIG. 2, Ref. 4) and capturing the rope. To release the rope the Latch Release Handle is pulled back, which sides the Latch Release (FIG. 1, Ref. 2) back, releasing the Latch (FIG. 2, Ref. 4).

DESCRIPTION OF THE VIEWS OF THE DRAWING

The drawing consists of three views.

FIG. 1 is a top view.

FIG. 2 is a side view.

FIG. 3 is an end view.

DETAILED DESCRIPTION OF THE INVENTION

The following describes the making of the invention.

The Mount (FIG. 1, Ref. 1) is made of standard 1/8"×1 1/2" channel iron. A piece 4 3/4" long is formed to shape with a hydraulic press. To this Mount are welded two 1/2"×1 1/2" pieces of 1/8"×1/2" iron strap (FIG. 1, Ref. 8) at the location shown in FIG. 1.

Next cut a piece of 1/8"×1 1/2" iron strap 1 1/2" in length to form the Plate (FIG. 1, Ref. 7). Drill a 3/16" hole through the center of this piece. Drill a 3/8" hole at 11/32" centers on two sides of the center hole. Countersink these three holes on one side of the Plate. Cut a piece of 3/16" rod 3/8" long (FIG. 2, Ref. 9). Insert this rod into the 3/16" hole in the Plate (FIG. 1, Ref. 7) and weld it on the countersunk side.

Cut two 3" long pieces of 3/8" stainless steel round stock to form the Guides (FIG. 2, Ref. 5). Drill a 1/8" hole through these Guides 1/4" from the end. Grind a small chamfer on this end of the Guides. Insert a 1/8" rod through the holes in the two Guides so as to maintain proper alignment while you insert the Guides into the two 3/8" holes that were drilled into the Plate (FIG. 1, Ref. 7). While maintaining the Guides in parallel alignment weld them to the Plate on the countersunk side. Grind the welds smooth.

Next, cut a piece of 0.120" wall thickness seamless stainless steel tubing 1" long. Using a lathe machine out 0.020" from the bore of this piece of tube Using a hydraulic press this piece is then formed into the Latch Release (FIG. 1, Ref. 2) Drill a 1/8" hole through the Latch Release 3/16" from the end and press a 1/8"×3/4" roll pin (FIG. 2, Ref. 12) into this hole.

The Latch (FIG. 2, Ref. 4) is formed from 3/8" stainless steel round stock by the use of a hydraulic press, and is ground to achieve the final shape. Drill a 1/8" hole through the Latch 3/16" from the end as shown in the drawings.

Make the Stop Block (FIG. 2, Ref. 6) by cutting a piece of 1/8"×3/4" iron strap 3/4" long.

Form the Latch Release Handle (FIG. 2, Ref. 3) by bending a 4" long piece of 3/16" rod to the desired shape. Weld this piece to the Latch Release (FIG. 1, Ref. 2) in the position indicated in the drawings.

Slide the Latch Release (FIG. 1, Ref. 2) onto the Guides (FIG. 2, Ref. 5). Place the Spring (FIG. 2, Ref. 10) into position and slide the Latch Release further onto the Guides, compressing the Spring until the front edge of the Latch Release is 1 9/16" from the ends of the Guides (FIG. 2, Ref. 5). Next position the Stop Block (FIG. 2, Ref. 6) and weld it to the Guides.

Place the Latch (FIG. 2, Ref. 4) between the Guides (FIG. 2, Ref. 5) and secure it by inserting a 1/8"×1" roll pin (FIG. 1, Ref. 11).

This entire assembly is attached to the Mount (FIG. 1, Ref. 1) by welding the Plate (FIG. 1, Ref. 7) to the center point of the Mount. Grind the welds smooth.

I claim:

1. A rope release saddle horn attachment comprising a body having a semi-circular channel through which a buckled strap is passed for securing the attachment to a saddle horn, two guide pins on which a spring-loaded sliding sleeve is mounted, a stop block attached to the guide pins to ensure proper latch engagement, a latch pivotally mounted between the guide pins, and a handle attached to the sliding sleeve for releasing the latch by a pull thereon.

2. A rope release saddle horn attachment comprising a body having a pivotally mounted latch positioned to, when latched, retain a knotted end of a rope extended through the latch spring loaded sliding sleeve to secure the latch in a closed position, a handle attached to the sliding sleeve for activating said sleeve to both engage latch to retain rope and disengage the latch by pulling said handle, and a buckled strap passed through a semi-circular channel and buckled around a saddle horn for securing the attachment to and removing the attachment from said saddle horn.

3. A device for temporarily attaching a rope to a saddle horn comprising:
   a. a mounting base having at least one opening thereon for receiving a securing strap for engaging said saddle horn;
   b. a support member attached at one end to said base and extending out therefrom;
   c. a rope latch having a first end that is pivotally attached to the opposite end of said support member, and having a second end that is capable of coming into contact with said support member;
   d. a sleeve slidably disposed around said support member such that said sleeve is capable of securing the second end of said rope latch against said support member;
   e. a biasing spring for urging said sleeve away from said base and against the second end of said rope latch; and
   f. a release lever attached to said sleeve for moving said slidable sleeve to release the second end of said rope latch therefrom.

\* \* \* \* \*